Patented May 20, 1930

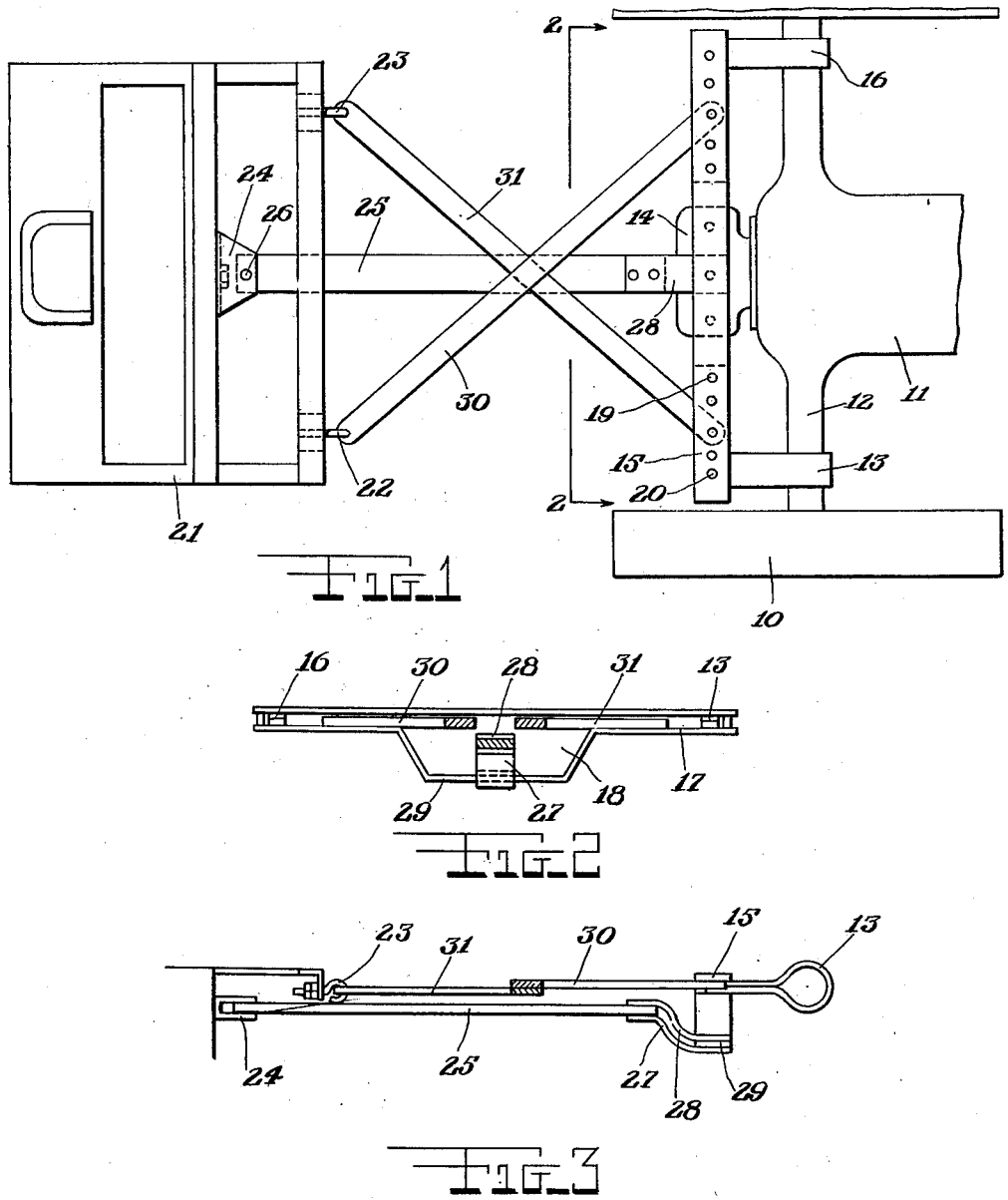

1,758,951

UNITED STATES PATENT OFFICE

ELMO W. JOHNSON, OF HICKSVILLE, NEW YORK

TRACTOR HITCH

Application filed November 11, 1927. Serial No. 232,521.

The main object of this invention is to provide a draft hitch which is suitable for use between a tractor and a trailer, such as an agricultural planter, harrow or the like. The hitch is so constructed as to cause the trailer to swing in a short turn when coming to the end of a field. This short swing eliminates a much larger swing which is made with the ordinary hitch and therefore a greater amount of acreage can be planted or cultivated.

Another object of the invention is to provide a hitch which is used between a tractor and a trailer and is so constructed as to be capable of adjustment so that a shorter or longer swing of the trailer is made possible.

The above and other objects will become apparent in the description below in which characters of reference refer to like-named parts in the drawing.

Referring briefly to the drawing, Figure 1 is a top plan view illustrating a tractor and trailer coupled to each other by the hitch mechanism.

Figure 2 is a cross sectional view taken on line 2—2 of Figure 1 showing the hitch per se.

Figure 3 is a side elevational view of Figure 1 showing the hitch but omitting the tractor and trailer from the view.

Referring in detail to the drawing, the numeral 10 indicates the wheels of a tractor whose body 11 housing the engine, is supported on an axle 12. The tractor hitch illustrated herein is particularly adapted to be used with the special type of wheel for which a patent has been granted to me under the No. 1,606,077, issued on Nov. 9, 1926.

Near the ends of the axle 12 adjacent to the tractor wheels straps 13 and 16 are mounted thereon and extend rearwardly. The ends continuing from the circular straps extend as a pair of flat members, one lying adjacent the other, and are inserted between an upper flat plate 15 and a guide plate 17 the latter being disposed beneath the plate 15. The latter is deformed downwardly at its middle to provide an enlarged space 18 at its middle in which a lug 14 projecting rearwardly from the tractor body 11, is housed. The plate 15 has a series of openings 19 formed therein thru which bolts pass for securing the hitch device to the tractor. The straps 13 and 16 are rigidly secured to the plate 15 and the guide plate 17 by rivets or bolts 20 or any other desirable means.

The trailer such as a planter or cultivator 21 is provided with a pair of eyelet bolts 22 and 23 which are rigidly mounted in place at the forward corners of the trailer. On the front wall of the trailer a channel bracket 24 is securely mounted.

A connector bar has its one end secured in the channeled bracket and is indicated by the numeral 25. The latter is secured in place in the bracket by a bolt 26 and its opposite end extends forwardly from the trailer and has connected thereto a pair of upwardly curved tongues 27 and 28. The forward ends of these tongues extend downwardly one above the other and are secured in this relation to the deformed bar 29 which forms part of the guide plate which is mounted integral with the plate 15.

A brace 30 extends diagonally from the eyelet 22 to the rear end of the tractor and is secured between the plate 15 and the guide plate 17 adjacent to the strap 16. A similar brace 31 is secured to the eyelet 23 positioned at the opposite end or corner of the trailer and extends diagonally forward being secured in the space between members 15 and 17 adjacent the strap 13.

The hitch described herein makes it possible for the coupled trailer and tractor to make a short lateral swing and thereby turn short corners so that more acreage can be planted and cultivated than is now possible. The draft bar 25 is directly coupled to the trailer and tractor and when the latter makes a turn, the draft bar 25 swings laterally to one side or the other. When the tractor swings toward the right or left the braces 30 and 31 thru their function prevent the trailer from simultaneously swinging in the same direction until such time as the tractor has arrived at a critical angle with respect to the trailer. Assuming that the tractor turns toward the right the brace bar 31 is pushed rearwardly and the brace bar is pulled forwardly a distance which will compensate for the swing of the tractor thereby causing the trailer to pursue a straight-a-way path while the tractor pursues a curved path.

It is to be noted that certain changes in form and construction may be made without departing from the spirit and scope of the invention.

I claim:

In combination with a tractor and trailer, a hitch for coupling the tractor and trailer comprising a perforated guide plate on the tractor, an additional plate disposed beneath the guide plate and having openings therein, straps securing the plates to the tractor, a draft bar pivotally secured to the front end of the trailer and the rear end of the tractor, eyelets at the front corners of the trailer, crossed braces pivotally connected to said eyelets extending diagonally forward and being secured to the additional plate and the guide plate in the space extending between these members, downwardly curved tongues secured to said draft bar and pivotally secured to said deformed bar, said braces being adapted to pull on one corner of the trailer and push on the opposite corner for retaining the trailer in straight line while the tractor is turning, the perforations on said guide plate being adapted to have bolts pass therethrough and to permit adjusted positions of said braces as desired to cause the trailer to pass around a shorter turn than the tractor.

In testimony whereof I affix my signature.

ELMO W. JOHNSON.